United States Patent
Miyata et al.

(10) Patent No.: US 8,036,165 B2
(45) Date of Patent: Oct. 11, 2011

(54) CHANNEL ALLOCATION METHOD FOR ALLOCATING CHANNELS TO TERMINAL APPARATUSES TO BE COMMUNICATED AND BASE STATION APPARATUS UTILIZING THE SAME

(75) Inventors: Takeo Miyata, Gifu (JP); Katsutoshi Kawai, Ichinomiya (JP)

(73) Assignee: Kyocera Corporation, Kyoto (JP)

( * ) Notice: Subject to any disclaimer, the term of this patent is extended or adjusted under 35 U.S.C. 154(b) by 845 days.

(21) Appl. No.: 11/630,800

(22) PCT Filed: May 16, 2005

(86) PCT No.: PCT/JP2005/008907
§ 371 (c)(1),
(2), (4) Date: Dec. 27, 2006

(87) PCT Pub. No.: WO2006/001135
PCT Pub. Date: Jan. 5, 2006

(65) Prior Publication Data
US 2007/0274335 A1    Nov. 29, 2007

(30) Foreign Application Priority Data
Jun. 28, 2004 (JP) ................. 2004-190256

(51) Int. Cl.
*H04W 4/00* (2009.01)
(52) U.S. Cl. ........ 370/329; 370/226; 370/263; 370/278; 370/282; 370/302; 370/322; 370/326; 370/335; 370/336; 370/341; 370/342; 370/345; 370/437; 370/441; 370/442; 445/464; 445/434; 445/450; 445/553.1; 445/561; 708/603; 708/523; 708/622; 375/137; 375/150
(58) Field of Classification Search ........... 370/226, 370/263, 278, 282, 302, 322, 326, 335, 336, 370/341, 342, 345, 437, 441, 442; 455/464, 455/434, 450, 553.1, 456.1, 561, 562.1; 708/603, 708/523, 622; 375/137, 150
See application file for complete search history.

(56) References Cited

U.S. PATENT DOCUMENTS

| | | | |
|---|---|---|---|
| 5,640,413 A * | 6/1997 | Ichihara | 375/130 |
| 6,067,290 A * | 5/2000 | Paulraj et al. | 370/329 |
| 2002/0159422 A1 * | 10/2002 | Li et al. | 370/342 |
| 2003/0169720 A1 * | 9/2003 | Sebastian et al. | 370/342 |

FOREIGN PATENT DOCUMENTS

CN    1496615 A    5/2004
(Continued)

OTHER PUBLICATIONS

Korean Office Action, with English Translation, issued in Korean Patent Application No. KR 10-2007-7002026, dated on Jan. 14, 2008.

(Continued)

*Primary Examiner* — Nimesh Patel
(74) *Attorney, Agent, or Firm* — Morrison & Foerster LLP

(57) ABSTRACT

The quality of signals during SDMA is raised.
In an uplink, a signal processing unit receives signals respectively from a plurality of terminal apparatuses which have been multiple-accessed by division of time. It derives receiving channel characteristics corresponding to the plurality of terminal apparatuses, respectively, for each time slot. In a downlink, the signal processing unit derives transmitting channel characteristics from the receiving channel characteristics derived and, based on the transmitting channel characteristics derived, it transmits signals respectively to the plurality of terminal apparatuses to which SDMA has been performed. In the downlink, a control unit allocates channels to the plurality of terminal apparatuses, respectively, in a manner that the plurality of terminal apparatuses are multiple-accessed by SDMA; and in the uplink it allocates channels to the plurality of terminal apparatuses, respectively, in a manner that the plurality of terminal apparatuses are multiple-accessed by TDMA.

3 Claims, 7 Drawing Sheets

FOREIGN PATENT DOCUMENTS

| | | |
|---|---|---|
| JP | 3-273723 A | 12/1991 |
| JP | 2003-124942 A | 4/2003 |
| JP | 2003-332971 | 11/2003 |
| WO | WO 00/79702 A1 | 12/2000 |

OTHER PUBLICATIONS

Japanese Office Action issued in Japanese Patent Application No. 2004-190256, dated Aug. 30, 2005.

Office Action with English translation for CN 200580019470.1, mailed May 8, 2009.

International Preliminary Report on Patentability and Written Opinion of The international Searching Authority issued in International Application No. PCT/JP2005/008907, dated Jan. 11, 2007.

Office Action issued in corresponding Taiwanese Application No. 94117628, dated Jul. 26, 2006.

* cited by examiner

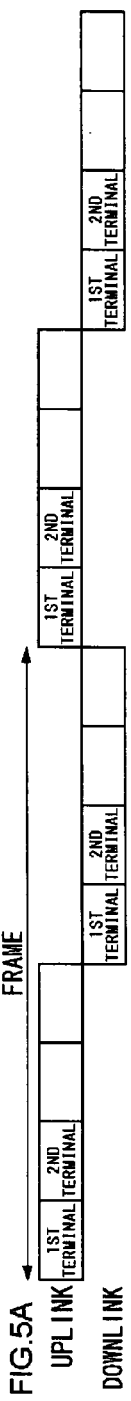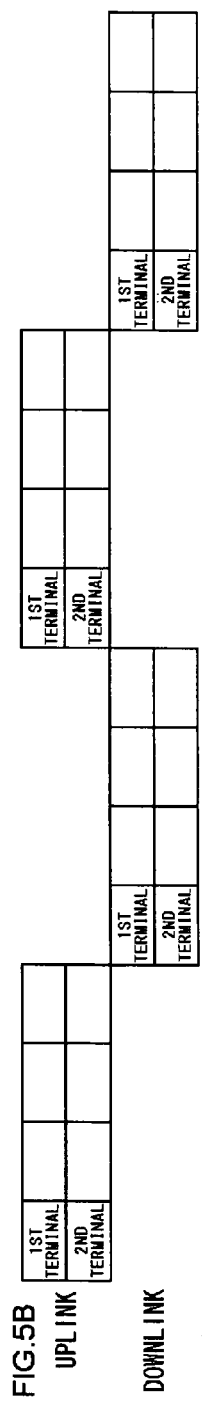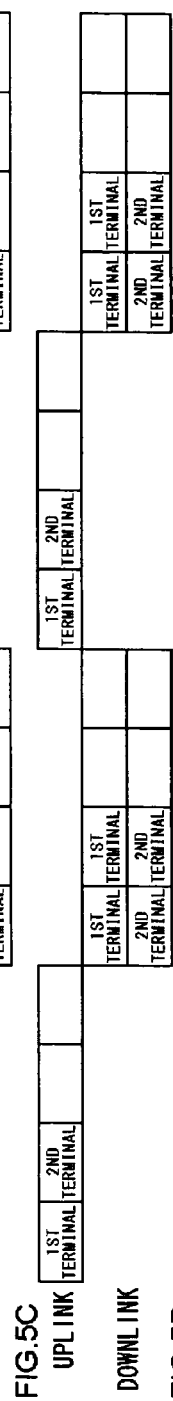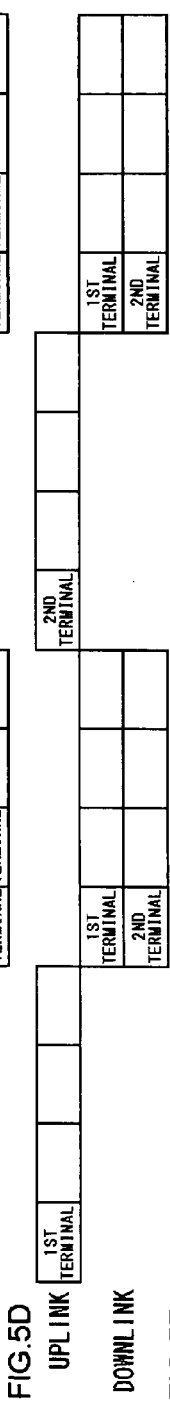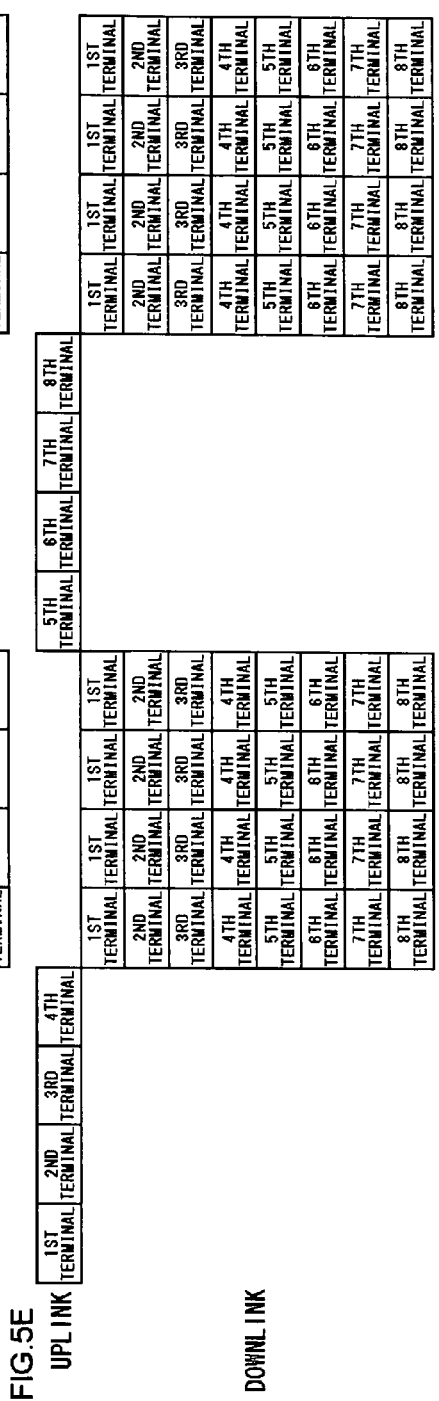

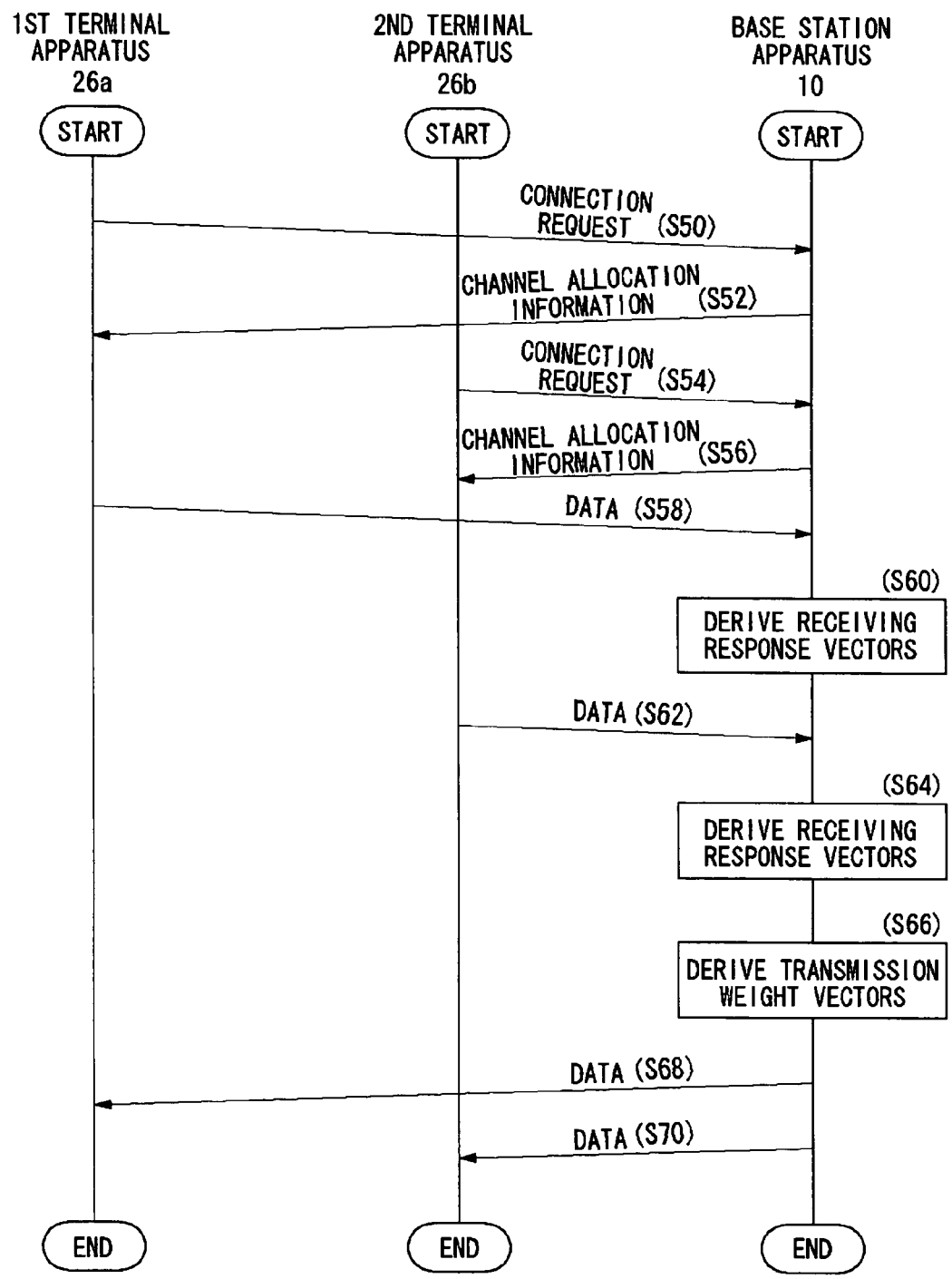

CHANNEL ALLOCATION METHOD FOR ALLOCATING CHANNELS TO TERMINAL APPARATUSES TO BE COMMUNICATED AND BASE STATION APPARATUS UTILIZING THE SAME

RELATED APPLICATIONS

This application is the U.S. National Phase under 35 U.S.C. §371 of International Application No. PCT/JP2005/008907, filed on May 16, 2005, which in turn claims the benefit of Japanese Application No. 2004-190256, filed on Jun. 28, 2004, the disclosures of which Applications are incorporated by reference herein.

TECHNICAL FIELD

This invention relates to a channel allocation method and receiving technology, and it particularly relates to a channel allocation method for allocating channels to terminal apparatuses to be communicated and a base station apparatus utilizing said method.

BACKGROUND TECHNOLOGY

In wireless communication, it is generally desired that the limited frequency resources be used effectively. In order to effectively utilize the frequency resources, the radio waves of the same frequency are used repeatedly as close in distance as possible, for example. In that case, the communication quality degrades due to the co-channel interference from the neighboring base station apparatuses or the like that use the same frequency. One of the techniques to prevent the degradation of communication quality due to the co-channel interference is adaptive array antenna technology. In the adaptive array antenna technology, the signals received by a plurality of antennas, respectively, are weighted with different weighting factors and then combined together. For example, the weighting factors are adaptively updated in such a manner as to reduce the error between a signal to be referred to and the combined signal.

To adaptively update the weighting factors, adaptive algorithms, such as RLS (Recursive Least Squares) algorithm and LMS (Least Mean Squares) algorithm, are used. There are also cases where the weighting factors are calculated based on the response factors in a channel between a transmitting side to a receiving side. There are also cases where a radio apparatus equipped with an adaptive array antenna technology derives transmitting weight factors based on the weighting factors and response factors derived from the received signals and then the signals to be transmitted are transmitted after having weighted with said transmitting weighting factors. In this manner, in the adaptive array antenna technology the desired components are extracted from the received and the directivity at the time of transmitting the signals is adjusted, so that the degradation of the communication quality due to the co-channel interference can be prevented (See Patent Document 1, for instance).
[Patent Document 1] International Publication WO00/079702 Pamphlet.

The multiple access technique utilizing the adaptive array antenna technique is space division multiple access (SDMA) or path division multiple access (PDMA). In a base station apparatus using SDMA, a time slot in the same frequency is spatially divided in plurality, based on the adaptive array antenna technique, for example, and the radio channels associated respectively with the divided spaces are allotted to terminal apparatuses. In this manner, said base station apparatus transmits data to the terminal apparatuses to which the radio channels have been allotted.

Under these circumstances, the inventors of the present invention came to recognize the following problems to be solved. In a case where the intensity difference of signals received respectively from a plurality of terminal apparatuses multiplexed by SDMA is large or in a case where spatial correlation values of a plurality of terminal apparatuses multiplexed by SDMA are large, there are cases where the base station apparatus cannot achieve sufficient spatial separation of a plurality of terminal apparatuses. For the former case, this is because a plurality of signals, having difference greater than the difference between the maximum signal intensity and the minimum signal intensity, in the antenna directivity realized by the receiving weight vectors exceed a separation limit achievable by the adaptive array. Also, in a case where difference in power among a plurality of terminal apparatuses is large, the signal of a user in the side of small power may be hidden behind those in the side of larger power or enough dynamic range cannot be obtained, so that the user signals will not be estimated accurately.

For the latter case, this is because the arrival angles of signals transmitted from a plurality of terminal apparatuses are close to one other. Even in a case when the signals received from a plurality of apparatuses are separated according to the directions, there are cases where no correspondence is established between the respective signals thus separated and a plurality of terminals. That is, it is difficult to establish correspondence between the terminal apparatuses and the arrival directions of signals or the receiving weight vectors. Further, since the transmission processing is carried out based on the above receiving processing, the incompleteness of spatial separation in a plurality of terminals at the time of receiving will affect the transmission performance.

DISCLOSURE OF THE INVENTION

The present invention has been made in view of these circumstances and an object thereof is to provide an channel allocating method by which to resolve the incompleteness of spatial separation in a plurality of terminal apparatuses in SDMA, and a base station apparatus utilizing the same.

One embodiment of the present invention relates to a base station apparatus. This apparatus comprises: a communication unit which communicates with a plurality of terminal apparatuses, respectively; and a control unit which allocates channels respectively to the plurality of terminal apparatuses in a manner that, in a downlink, the plurality of terminal apparatuses are multiple-accessed by division of space and, in an uplink, the plurality of terminal apparatuses are multiple-accessed by division of multiplexing factor other than the space.

"Channel" is a wireless communication path set to perform a communication between radio apparatuses such as between a base station and a terminal apparatus. More specifically, it indicates a specific frequency band in the case of FDMA (Frequency Division Multiple Access), a specific time slot or slot in the case of TDMA (Time Division Multiple Access), a specific code sequence in the case of CDMA (Code Division Multiple Access), and a specific space or path. Here, it may be arbitrary one of them.

With the above apparatus, in the uplink a plurality of terminal apparatuses are not multiple-accessed by the division of space, so that the incompleteness of spatial division can be avoided. In the downlink, a plurality of terminal apparatuses are multiple-accessed by the spatial division, so that the capacity of transmission can be increased.

The communication unit may include: a receiving processing unit which receives respectively signals from the plurality of terminals which have been multiple-accessed by the division of multiplexing factor other than the space and which derives respectively receiving channel characteristics corresponding to the plurality of terminal apparatuses, for each signal received from one of the plurality of terminal apparatuses; and a transmission processing unit which derives transmitting channel characteristics from the receiving channel characteristics derived by the receiving processing unit and which transmits signals respectively to the plurality of terminal apparatuses which have been multiple-accessed by the division of space, based on the transmitting channel characteristics derived.

"Receiving channel characteristics" represent channel characteristics in the received signals, and any equivalent to the characteristic of a channel will suffice. They include, for example, a receiving response vector, a receiving weight vector and a received power.

"Transmitting channel characteristics" represent channel characteristics for signals to be transmitted, and any equivalent to the characteristic of a channel will suffice. They include, for example, a transmission response vector and a transmission weight vector. Note that the value of "transmitting channel characteristics" may be identical to the value of "receiving channel characteristics".

The multiplexing factor other than the space may be time and in the uplink the control unit may allocate the plurality of terminal apparatuses respectively to a plurality of time slots to perform multiple access by division of time, and the receiving processing unit may derive respectively receiving channel characteristics corresponding to the plurality of terminal apparatuses, for each time slot. In the downlink, the control unit may allocate the plurality of terminal apparatuses allocated to the plurality of time slots in the uplink, to one time slot. The time slots to which a plurality of terminal apparatuses are to be allocated by the control unit may be such that a plurality of time slots constitute one frame, and frames are arranged contiguously; and the plurality of terminal apparatuses allocated respectively to time slots contained in different frames in the uplink may be allocated to one time slot in the downlink.

"Derive receiving derives respectively receiving channel characteristics corresponding to the plurality of terminal apparatuses, for each time slot" means that a receiving channel characteristic of one terminal apparatus allocated to one time slot is derived and the processings for these are conducted on a plurality of terminal apparatuses.

The "time slots contained in the different frames in the uplink" indicate, for example, time slots contained in an odd-numbered frame and those contained in an even-numbered frame.

Another embodiment of the present invention relates to a channel allocation method. This method is characterized in that, in a downlink, channels are allocated respectively to a plurality of terminal apparatuses so that the plurality of terminal apparatuses are multiple-accessed by division of space, and, in an uplink, channels are allocated respectively to a plurality of terminal apparatuses so that the plurality of terminal apparatuses are multiple-accessed by division of multiplexing factor other than the space.

Still another embodiment of the present invention relates also to a channel allocation method. This method includes: communicating with a plurality of terminal apparatuses; and allocating channels respectively to the plurality of terminal apparatuses in a manner that, in a downlink, the plurality of terminal apparatuses are multiple-accessed by division of space and, in an uplink, the plurality of terminal apparatuses are multiple-accessed by division of multiplexing factor other than the space.

The communicating may include: receiving respectively signals from the plurality of terminals which have been multiple-accessed by the division of multiplexing factor other than the space and deriving respectively receiving channel characteristics corresponding to the plurality of terminal apparatuses, for each signal received from one of the plurality of terminal apparatuses; and deriving transmitting channel characteristics from the receiving channel characteristics derived and transmitting, based on the transmitting channel characteristics derived, signals respectively to the plurality of terminal apparatuses which have been multiple-accessed by the division of space. In the allocating, the multiplexing factor other than the space may be time and, in the uplink, the plurality of terminal apparatuses may be allocated respectively to a plurality of time slots to perform multiple access by division of time, and the deriving respectively receiving channel characteristics may derive respectively receiving channel characteristics corresponding to the plurality of terminal apparatuses, for each time slot.

The allocating may be such that, in the downlink, the plurality of terminal apparatuses allocated to the plurality of time slots in the uplink is allocated to one time slot. The time slots to which a plurality of terminal apparatuses are to be allocated in the allocating may be such that a plurality of time slots constitute one frame, and frames are arranged contiguously; and the plurality of terminal apparatuses allocated respectively to time slots contained in different frames in the uplink may be allocated to one time slot in the downlink.

Still another embodiment of the present invention relates to a program. This program is executed by a computer, and the program includes the functions of: communicating with a plurality of terminal apparatuses via a radio network; and allocating channels respectively to the plurality of terminal apparatuses in a manner that, in a downlink, the plurality of terminal apparatuses are multiple-accessed by division of space and, in an uplink, the plurality of terminal apparatuses are multiple-accessed by division of multiplexing factor other than the space, and storing, in memory, information on the channels assigned respectively to the plurality of terminal apparatuses.

The communicating may include: receiving respectively signals, via a wireless network, from the plurality of terminals which have been multiple-accessed by the division of multiplexing factor other than the space, deriving respectively receiving channel characteristics corresponding to the plurality of terminal apparatuses, for each signal received from one of the plurality of terminal apparatuses, and storing them in memory; and deriving transmitting channel characteristics from the receiving channel characteristics stored and transmitting, based on the transmitting channel characteristics derived, signals respectively via a wireless network, to the plurality of terminal apparatuses which have been multiple-accessed by the division of space. In the storing information on the channels in memory, the multiplexing factor other than the space may be time and, in the uplink, the plurality of terminal apparatuses may be allocated respectively to a plurality of time slots to perform multiple access by division of time, and the deriving respectively receiving channel characteristics and storing, them in memory may derive respectively receiving channel characteristics corresponding to the plurality of terminal apparatuses, for each time slot.

The storing information on the channels in memory may be such that, in the downlink, the plurality of terminal apparatuses allocated to the plurality of time slots in the uplink is allocated to one time slot. The time slots to which a plurality of terminal apparatuses are to be allocated in the storing information on the channels in memory may be such that a plurality of time slots constitute one frame, and frames are arranged contiguously; and the plurality of terminal apparatuses allocated respectively to time slots contained in different frames in the uplink may be allocated to one time slot in the downlink.

It is to be noted that any arbitrary combination of the aforementioned constituent elements and the expression of the present invention changed among a method, an apparatus, a system, a recording medium, a computer program and so forth are also effective as the embodiments of the present invention.

Effects of the Invention

According to the present embodiment, the incompleteness of spatial separation in a plurality of terminal apparatuses in SDMA can be resolved.

BRIEF DESCRIPTION OF THE DRAWINGS

FIGS. 5A to 5E show structures of channels allocated by a base station apparatus of FIG. 1;

FIG. 7 is a sequence diagram showing a procedure for communication processing by the communication system of FIG. 1.

Figure 1:
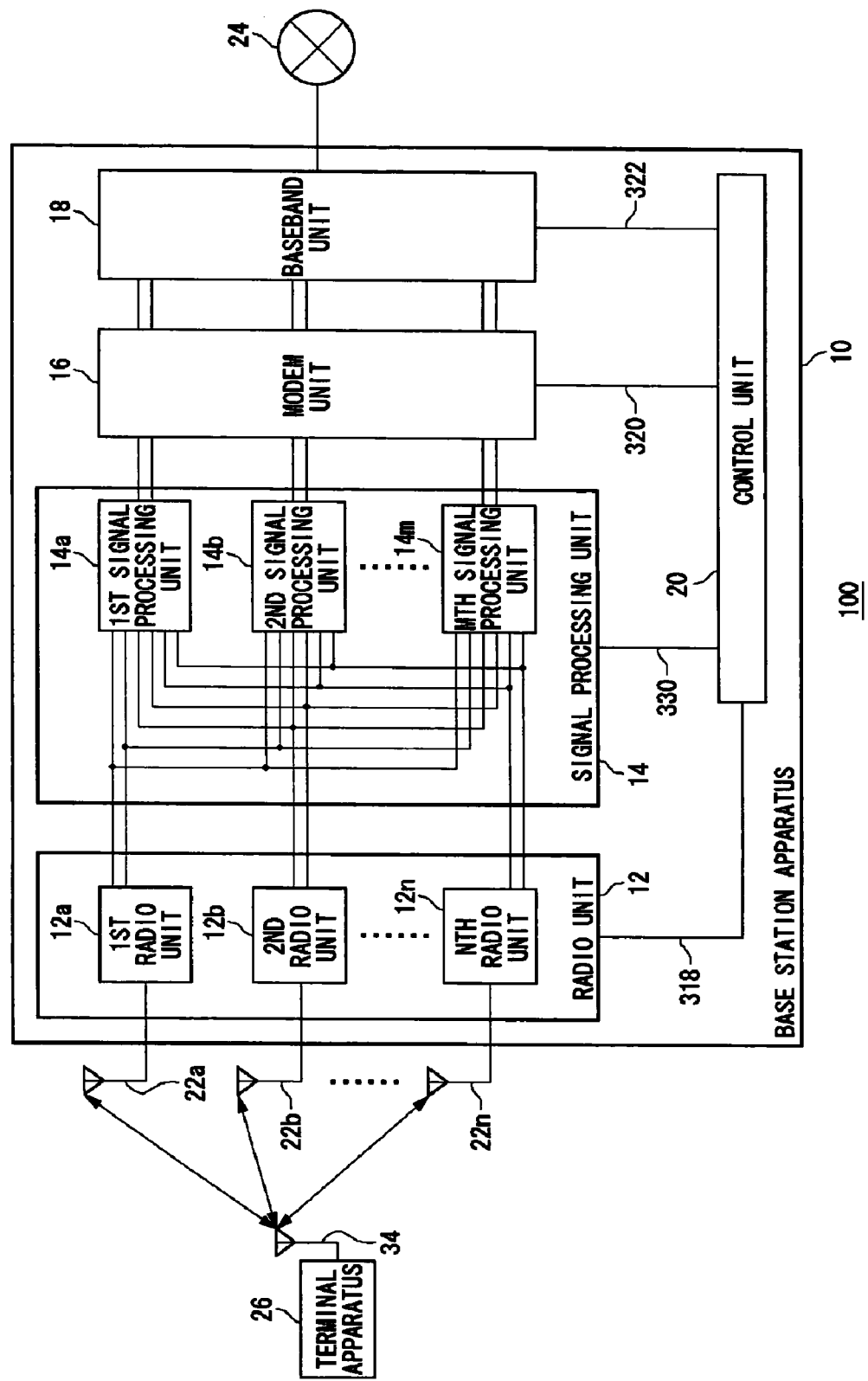
FIG. 1 shows a structure of a communication system according to an embodiment of the present invention.

DESCRIPTION OF REFERENCE NUMERALS 10 base station apparatus, 12 radio unit, 14 signal processing unit, 16 modem unit, 18 baseband unit, 20 control unit, 22 antenna, 24 network, 26 terminal apparatus, 34 antenna, 36 switching unit, 38 receiver, 40 transmitter, 42 frequency conversion unit, 44 quadrature detection unit, 46 AGC, 48 AD conversion unit, 50 amplification unit, 52 frequency conversion unit, 54 quadrature modulation unit, 56 DA conversion unit, 68 combining unit, 70 receiving weight vector computing unit, 72 reference signal generator, 74 separation unit, 76 transmission weight vector computing unit, 78 multiplier, 80 adder, 82 multiplier, 100 communication system, 200 receiving response vector computing unit, 300 digital received signal, 302 digital transmission signal, 304 composite signal, 306 pre-separation signal, 308 receiving weight vector, 310 transmission weight vector, 312 reference signal, 318 radio unit control signal, 320 modem unit control signal, 322 baseband unit control signal, 330 signal processor control signal, 402 receiving response vector.

THE BEST MODE FOR CARRYING OUT THE INVENTION

Before describing the present invention in a specific manner, an outline thereof will be described. Embodiments of the present invention relate to a base station apparatus that accesses terminal apparatuses and has an adaptive array antenna technique. In the present embodiments, assumed is a communication system that performs uplink and downlink using TDD (Time Division Duplex) as in a personal handy-phone system. The base station apparatus multiplexes a plurality of terminal apparatuses by TDMA and SDMA. Here, the structure of TDMA/TDD is assumed. Then the frames are arranged contiguously, and for each frame, four time slots are each arranged for use in uplink and downlink. Further, since the base station apparatus performs SDMA, a plurality of channels are provided, in one time slot, by dividing a space and the respective channels are allocated to the terminal apparatuses.

In the base station according to the present embodiment, a plurality of channels are provided for a time slot for use in downlink, whereas one channel is provided for a time slot for use in uplink. That is, SDMA is performed in the downlink but no SDMA is performed in the uplink. Based on the signal received from a terminal apparatus, the base station apparatus calculates a receiving weight vector or receiving response vector for a time slot for use in uplink. Since the aforementioned calculation is performed on a terminal apparatus, establishing the correspondence between the separated signal and the terminal apparatus during the execution of SDMA in the uplink is no longer necessary. That is, the separation of signals for each of a plurality of terminal apparatuses is not required. As a result, the incompleteness of spatial separation due to such correspondence can be avoided. The transmission weight vectors, at the time of transmitting signals to a plurality of terminal apparatuses in which SDMA is to be performed in a time slot of downlink, are derived based on the aforementioned calculation. Accordingly, in the downlink the SDMA can be performed under a state in which the incompleteness of spatial separation is eliminated.

FIG. 1 illustrates a structure of a communication system 100 according to an embodiment of the present invention. The communication system 100 includes a base station apparatus 10, a terminal apparatus 26, and a network 24. The base station apparatus 10 includes a first antenna 22a, a second antenna 22b, ... and an nth antenna 22n, which are generically called "antenna 22", a radio unit 12, a signal processing unit 14, a modem unit 16, a baseband unit 18 and a control unit 20, and is connected with the network 24. The radio unit 12 includes a first radio unit 12a, a second radio unit 12b, ... and an Nth radio unit 12n. The signal processing unit 14 includes a first signal processing unit 14a, a second signal processing unit 14b, ... and an Mth signal processing unit 14m. Signals includes a radio unit control signal 318, a modem unit control unit 320, a baseband unit control signal 322 and a signal processor control signal 330. In the communication system of FIG. 1, the base station apparatus 10 is connected with a single terminal apparatus 26 but in the actual setting it can be connected with a plurality of terminal apparatuses 26. In particular, M terminal apparatuses 26 can be connected, for each time slot, by SDMA.

The baseband unit 18 in the base station apparatus 34 is an interface with the network 24, and performs transmission/receiving processing on information signals to be transmitted in the communication system. Error correction or automatic retransmission processing may be carried out but the description thereof is omitted here.

As a modulation processing, the modem unit modulates the information signals to be transmitted, using π/4 shift QPSK (Quadrature Phase Shift Keying) modulation scheme. As a demodulation processing, it demodulates the received signals and reproduces the information signals transmitted. Note that an instruction necessary for performing the modulation processing and the demodulation processing is carried out by the modem unit control signal 320 from the control unit 20.

The signal processing unit 14 performs a signal processing necessary for the transmission/receiving processing by the adaptive array antenna. Though the details will be discussed later, in the downlink it accesses a plurality of terminal apparatuses 26 by SDMA, based on the adaptive array antenna technology, and communicates with these. Here, M signal processing units 14 correspond to the number of terminal apparatuses 26 which are space-division-multiple-accessible in one time slot. In the uplink, on the other hand, it accesses a plurality of terminal apparatuses 26 by TDMA and communicates with these. Accordingly, the number of signal processing units 14 which are functioning is only the number of terminal apparatuses 26 on which SDMA is to be performed in the transmission processing, and the first signal processing unit 14a only operates in the receiving processing.

In the uplink, the signal processing unit 14 receives signals, respectively, from a plurality of terminal apparatuses 26 that have been subjected to multiplexing factors other than the space, namely time-division-multiple-access here. It derives the receiving channel characteristics corresponding to a plurality of terminal apparatuses 26, respectively, in units of signal received from one of the plurality of terminal apparatuses 26, namely in units of time slot. Here, the receiving channel characteristics are receiving weight vectors or receiving response vectors, for example. In the downlink, the processing unit 14 derives the transmitting channel characteristics from the derived receiving channel characteristics. Based on the derived transmitting channel characteristics, it transmits signals to a plurality of terminal apparatuses 26 to which SDMA has been performed, respectively.

The radio unit 12 carries out frequency conversion processing between baseband signals and radiofrequency signals, wherein the baseband signals are processed by the signal processing unit 14, the modem unit 16 and the baseband unit 18. It performs amplification processing, AD or DA conversion processing and the like.

The antennas 22 perform transmission/receiving processings on radiofrequency signals. The directivity of antenna may be arbitrary and the number of antennas 22 is denoted by N.

The control unit 20 controls the timings as well as channel allocation of the radio unit 12, the signal processing unit 14, the modem unit 16 and the baseband unit 18. The control unit 20 allocates channels in the following manner. In the down link, the channels are allocated in such a manner as to access a plurality of terminal apparatuses 26 respectively by SDMA, whereas in the uplink the channels are allocated in such a manner as to access a plurality of terminal apparatuses 26 respectively by a connection other than SDMA, namely by TDMA here. The channels in the uplink correspond directly to time slots. In the downlink, on the other hand, the control unit 20 allocates the terminal apparatuses 26 assigned to a plurality of time slots in the uplink, respectively, to one time slot. In a case where the time slots to be allocated to a plurality of terminal apparatuses 26 constitute one frame, in a manner that a plurality of time slots are contained therein, and frames are arranged contiguously, the control unit 29 may allocate in the downlink a plurality of terminal apparatuses 26 allocated respectively to the time slots contained in the different frames in the uplink, to one time slot.

Figure 2:
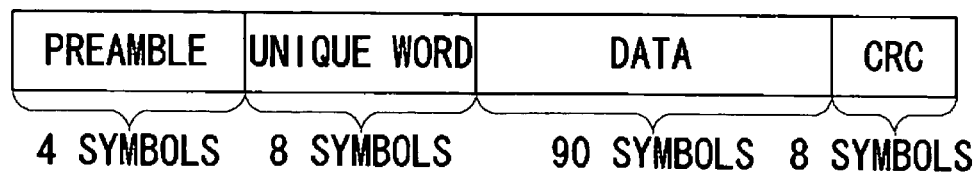
FIG. 2 shows a burst format according to an embodiment of the present invention.

FIG. 2 shows a burst format according to an embodiment of the present invention. This is a burst format of a personal handyphone system. A preamble is placed in the four leading symbols of a burst, which is used for timing synchronization. A unique word is placed in the subsequent eight symbols. The preamble and the unique word, which are both known to the base station apparatus 10 and the terminal apparatuses 26, can also be used as a training signal, which will be described later. For simplification of explanation, the present embodiment will be described with reference to the burst format shown in FIG. 2 of a personal handyphone system but the present invention is not limited thereto.

Figure 3:
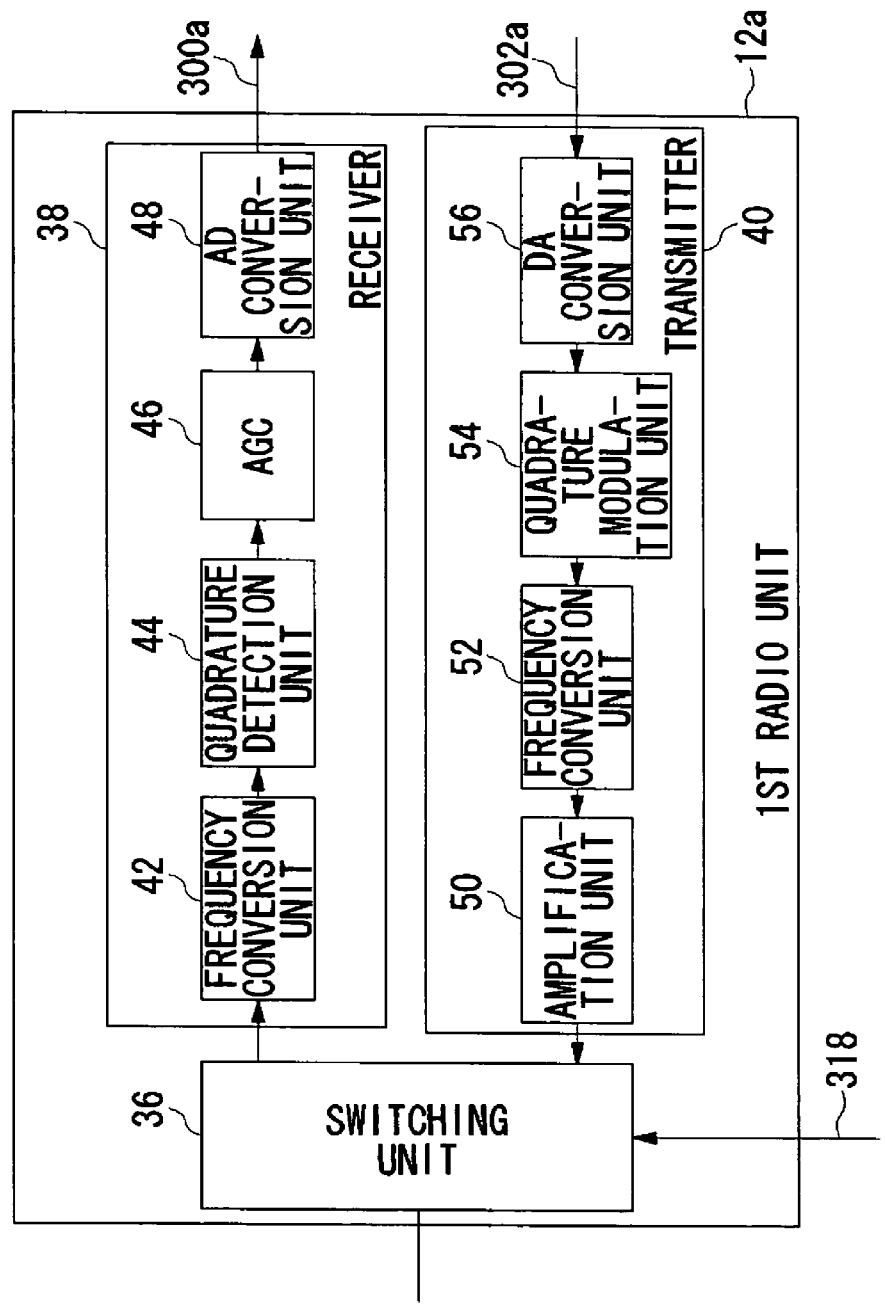
FIG. 3 shows a structure of a first radio unit in FIG. 1.

FIG. 3 shows a structure of the first radio unit 12a. The first radio unit 12a includes a switching unit 36, a receiver 38 and a transmitter 40. The receiver 38 includes a frequency conversion unit 42, a quadrature detection unit 44, an AGC (Automatic Gain Control) 46 and an AD conversion unit 48. The transmitter 40 includes an amplification unit 50, a frequency conversion unit 52, a quadrature modulation unit 54 and a DA conversion unit 56. Signals include a first digital received signal 300a, which is generically referred to as a digital received signal 300, and a first digital transmission signal 302a, which is generically referred to as a digital transmission signal 302.

The switching unit 36 switches input and output of signals to the receiver 38 and the transmitter 40 based on instructions of the radio unit control signal 318.

The frequency conversion unit 42 in the receiver 38 and the frequency conversion unit 52 in the transmitter 40 perform frequency conversion between a radiofrequency signal and one or more intermediate-frequency signals.

The quadrature detection unit 44 generates baseband analog signals from intermediate-frequency signals through quadrature detection. The baseband signal, which generally contains in-phase components and quadrature-phase components, shall be represented by two signal lines. For the sake of clarity in the figure, the baseband signal is presented here by a single signal line, and the same will be applied hereinafter. On the other hand, the quadrature modulation unit 54 generates intermediate-frequency signals from baseband analog signals through quadrature modulation.

The AGC 46 automatically controls gain so that the amplitude of baseband analog signals lies within the dynamic range of the AD conversion unit 48.

The AD conversion unit 48 converts baseband analog signals into digital signals, and the DA conversion unit 56 converts baseband digital signals into analog signals. Here, the digital signals outputted from the AD conversion unit 48 are called digital received signals 300, and the digital signals inputted to the DA conversion unit 56 are called digital transmission signals 302.

The amplification unit 50 amplifies radiofrequency signals to be transmitted.

Figure 4:
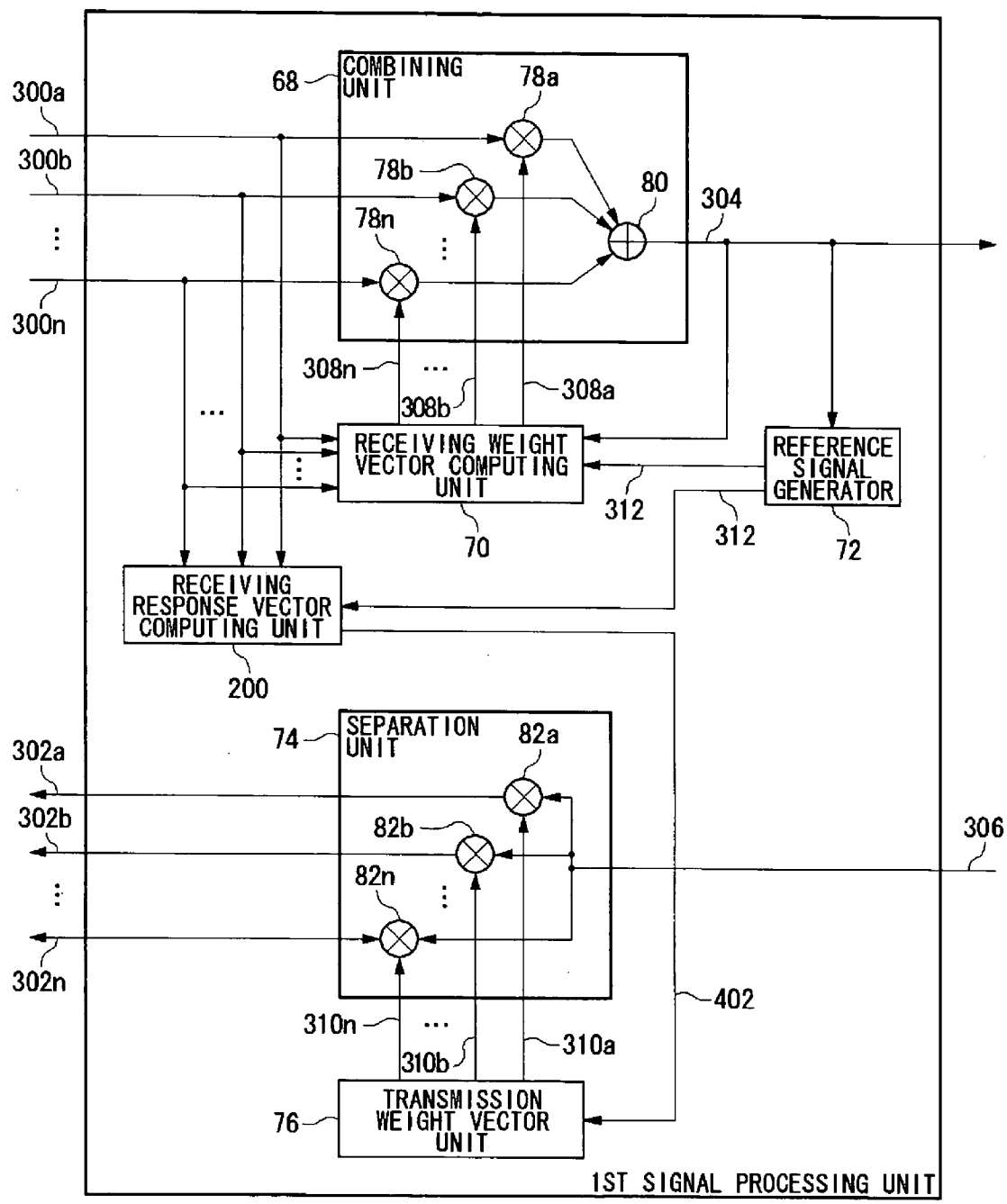
FIG. 4 shows a structure of a first signal processing unit in FIG. 1.

FIG. 4 shows a structure of the first signal processing unit 14a. The first signal processing unit 14a includes a reference signal generator 72, a receiving weight vector computing unit 70, a combining unit 68, a receiving response vector computing unit 200, a transmission weight vector computing unit 76 and a separation unit 74. The combining unit 68 includes a first multiplier 78a, a second multiplier 78b, . . . and an Nth multiplier 78n, which are generically referred to as multiplier 78 and an adder 80. The separation unit 74 includes a first multiplier 82a, a second multiplier 82b, . . . and an Nth multiplier 82n, which are generically referred to as multiplier 82.

Signals include a composite signal 304, a pre-separation signal 306, a first receiving weight vector 308a, a second receiving weight vector 308b, . . . and an Nth receiving weight vector 308n, which are generically referred to as receiving weight vector 308, a first transmission weight vector 310a, a second transmission weight vector 310b, . . . and an Nth transmission weight vector 310n, which are generically referred to as transmission weight vector 310, a reference signal 312 and a receiving response vector 402.

The reference signal generator 72 stores the preamble signals shown in FIG. 2. During a training period, the reference signal generator 72 outputs the stored preamble signal as a reference signal 312. After the training period, the composite signal 304 is determined and the determined signal is outputted as a reference signal 312. It is assumed that the termination of a training period is notified by the signal processor control signal 330 from the not-shown control unit 20.

The receiving weight vector computing unit 70 computes receiving weight vectors 308 necessary for weighting the digital received signals 300, using an adaptive algorithm such as RLS (Recursive Least Squares) algorithm and LMS (Least Mean Squares) algorithm. The computation using the adaptive algorithm is done based on the digital received signal 300, the composite signal 304 and the reference signal 312. For example, the LMS algorithm is expressed as follows.

$$w(n+1)=w(n)+\mu u(n)e^*(n)$$ [Equation 1]

where w is a receiving weight vector 308, μ is a forgetting factor, u is a digital received signal 300 and e is an error indicative of intersymbol interference, namely the error between a composite signal 304 and a reference signal 312.

The multipliers 78 weight the digital received signal 300 with the receiving weight vector 308. The adder 80 adds up the outputs from the multipliers 78 so as to output the composite signal 304.

The receiving response vector computing unit 200 computes the receiving response vectors 402 as the receiving response characteristics of received signals in relation to transmitted signals. For convenience of explanation, assume herein that the number of terminal apparatus 26 is two. Of these, the first terminal apparatus 26 corresponds to a targeted terminal apparatus whereas the second terminal apparatus 26 is not the targeted terminal apparatus but corresponds to an interference source. Thus, it is assumed herein that a signal for the second terminal apparatus is inputted from the not-shown second signal processing unit 14b and the like. If the second terminal apparatus 26 as the interference source is not considered here, then the terms relating to the second terminal apparatus 26 may be removed from the following description. For convenience of explanation, assume herein that the number of antennas 22 is four. An input signal vector X(t) corresponding to the digital received signal 300 is expressed as follows.

$$X(t)=H_1 Srx_1(t)+H_2 Srx_2(t)+N(t)$$

where $Srx_i(t)$ represents a signal transmitted from the ith terminal apparatus 26. And X(t) is the input signal vector as mentioned above and is expressed as follows if each of digital received signals 300 is expressed by $RX_j(t)$ where j is the antenna number in the not-shown antennas 22 and T denotes the transpose of a matrix.

$$X(t)=[RX_1(t), RX_2(t), \Lambda, RX_4(t)]^T$$ [Equation 3]

$H_i$ is a receiving response vector 402 and is expressed as follows if the response coefficient of a signal, from the ith terminal apparatus 26, received by the jth antenna 22 is denoted by $h_{ij}$.

$$H_i=[h_{1i}, h_{2i}, \Lambda, h_{4i}]^T (i=1,2)$$ [Equation 4]

N(t) is a noise vector and is expressed as follows if the noise contained in a signal received by the jth antenna 22, namely the noise contained in the jth digital received signal 300 is denoted by $n_j(t)$.

$$N(t)=[n_1(t), n_2(t), \Lambda, n_4(t)]^T$$ [Equation 5]

Here, if the adaptive array in the signal processing unit 14 works normally, the signals from a plurality of terminal apparatus 26 can be separated, so that the above-described $Srx_i(t)$ are all known signals. Regardless of this condition, the above-described $Srx_i(t)$ are all known signals in a training signal period, too. Utilizing these, the receiving response vector 402 can be derived as follows.

If an ensemble average is calculated based on a signal $Srx_i(t)$ from the first terminal apparatus 26, then it is represented as follows.

$$E[X(t) \cdot Srx_1^*(t)]=H_1 E[Srx_1(t) \cdot Srx_1^*(t)]+H_2 E[Srx_2(t) \cdot Srx_1^*(t)]+E[N(t) \cdot Srx_1^*(t)]$$

Though E denotes the ensemble average, it is assumed herein that the processing for ensemble average is replaced by the processing for time average. If the processing for time average is executed for a sufficient period of time, the following results.

$$E[Srx_1(t) \cdot Srx_1^*(t)]=1$$

$$E[Srx_2(t) \cdot Srx_1^*(t)]=0$$

$$E[N(t) \cdot Srx_1^*(t)]=0$$ [Equation 7]

This is because there is no correlation between $Srx_1(t)$ and $Srx_2(t)$ and furthermore there is no correlation between $Srx_1(t)$ and N(t). $H_1$ that corresponds to the receiving response vector 402 as above is expressed as follows.

$$H_1=E[X(t) \cdot Srx_1^*(t)]$$ [Equation 8]

The transmission weight vector computing unit 76 estimates the transmission weight vectors 310 necessary for weighting the pre-separation signal 306, from the receiving weight vector 308 or the receiving response vector 402 which is the receiving response characteristic. The method for estimating the transmission weight vectors 310 is arbitrary. As a most simple method therefor, however, the receiving weight vector 308 may be used as it is. Or, the receiving weight vector signal 308 or the receiving response vector 402 may be corrected using a conventional technique in view of the Doppler frequency change of a propagation environment caused by time difference in between a receiving processing and a transmission processing. Here, for simplification of explanation, the receiving response vector 402 is to be used for the estimation of transmission weight vectors 310. However, the receiving weight vector 308 inputted through a signal line which is not shown in FIG. 6 may be used.

The receiving response vectors 402, corresponding respectively to terminal apparatuses 26 on which SDMA is to be performed, have already been derived in the receiving response vector computing unit 200. In the light of Doppler frequency change for the receiving response vectors 402, the predicted values of the receiving response vectors 402 are indicated as follows.

$$V^{(q)}(i)=[h_1^{(q)}(i), h_2^{(q)}(i), h_3^{(q)}(i), h_4^{(q)}(i)]$$ [Equation 9]

Here, it is assumed in the same way as in the description of the receiving response vector computing unit 200 that the number of antennas 22 is four. Note that q indicates the qth terminal apparatus 26, and this corresponds to a terminal apparatus 26 on which SDMA is to be performed in the same time slot. Also, i denotes time.

The transmission weight vector 310 for the first terminal apparatus 26 is expressed as follows.

$$W^{(1)}(i)^T V^{(q)}(i)=0$$ [Equation 10]

Suppose here that q is two or more. Further, the following conditions c1) and c2) are imposed as constraints.

[Equation 11]

$$W^{(1)}(i) V^{(1)}(i)=g \text{ (constant value)}$$ c1)

$$\|W^{(1)}(i)\| \text{ is minimized}$$ c2)

The estimation of the transmission weight vectors 310 is not limited thereto, and a method using pseudo-correlation value or a method in which the beam is aimed toward a predetermined terminal apparatus 26 may be carried out. In particular, the method related to the pseudo-correlation value is described in T. Ohgane, Y. Ogawa and K. Itoh, Proc. VTC'97, vol. 2, pp. 725-729, May 1997, for example.

The multipliers 82 weight the pre-separation signal 306 with the transmission weight vectors 310 and output the digital transmission signals 302.

In terms of hardware, this structure can be realized by a CPU, a memory and other LSIs of an arbitrary computer. In terms of software, it can be realized by memory-loaded programs which have reserving and managing functions or the like, but drawn are function blocks that are realized in cooperation with those. Thus, it is understood by those skilled in the art that these function blocks can be realized in a variety of forms such as by hardware only, software only or the combination thereof.

FIGS. 5A to 5E show structures of channels allocated by the base station apparatus 10. Though the description of channels assigned to a control signal is omitted here, the channels may be provided as necessary. FIG. 5A shows a structure of channels allocated in a conventional TDMA. As shown in FIG. 5A, one frame is composed of eight time slots, and the eight time slots contain four uplink time slots and four downlink time slots. The base station apparatus 10 assigns one each uplink time slot and downlink time slot to the first terminal apparatus. The same applies to the second terminal apparatus 26. Note that a time slot corresponds to a channel here.

FIG. 5B shows a structure of channels allocated by the conventional SDMA. As shown in FIG. 5B, it is assumed here that TDMA is also used together with SDMA. As a result of division of a space, two channels are provided for one uplink time slot. Two channels in one time slot are allocated to the first terminal apparatus 26 and the second terminal apparatus 26, respectively. The same applies to a downlink time slot.

FIG. 5C shows a structure of channels allocated by the base station apparatus 10 according to the present embodiment. Similar to the above, one frame contains eight time slots. Similar to FIG. 5A, four time slots are contained in each frame for an uplink time slot, and a time slot corresponds to a channel. Accordingly, another uplink time slot is assigned to the first terminal apparatus 26 and the second terminal apparatus 26 in one frame. Thereby, the collision of signals sent respectively from the first terminal apparatus terminal 26 and the second terminal apparatus 26 is avoided. That is, TDMA is performed.

For a downlink time slot, two channels are provided for one downlink time slot the same way as in FIG. 5B. Further, two channels in a downlink time slot are assigned to the first terminal apparatus 26 and the second terminal apparatus 26. Here, two downlink channels are assigned to the first terminal apparatus 26 and the second terminal apparatus 26 for each frame in a manner that associates with the number of terminal apparatuses 26 to which an uplink time slot in each frame is to be assigned. As a result, the communication speed of downlink can be set higher than that of uplink. That is, SDMA is performed. This meets the request because the higher transmission rate is required by the downlink than by the uplink in consideration of the usage where mails are loaded and the Internet is accessed.

A description of FIG. 5C is given, as follows, based on values in a personal handyphone system. Although the communication is executed at a rate of 32 kbps for each time slot in the personal handyphone system, there are cases where two time slots are assigned in one frame for high speed purpose and the communication at a rate of 64 kbps is achieved. In FIG. 5C, in the uplink the communication is executed at a rate of 32 kbps in the first terminal apparatus 26 and the second terminal apparatus 26, respectively, whereas in the downlink the communication is executed at a rate of 64 kbps in the first terminal apparatus 26 and the second terminal apparatus 26, respectively.

FIG. 5D shows a structure of channels allocated by the base station apparatus 10 according to the present embodiment. Similar to the above, one frame contains eight time slots. The arrangement of time slots and channels for uplink and downlink in each frame is the same as in FIG. 5C. FIG. 5D differs from FIG. 5C in the relation between channels and the terminal apparatuses 26. For the uplink, the first terminal apparatus 26 and the second terminal apparatus 26 are allocated to the uplink time slots assigned respectively to the leading parts in another frame. That is, the first terminal apparatus 26 is assigned one uplink time slot for every two frames. The same applies to the second terminal apparatus 26. That is, the first terminal apparatus 26 and the second terminal apparatus 26 are alternately assigned the uplink time slot.

For the downlink, the first terminal apparatus 26 and the second terminal apparatus 26 are allocated respectively to two channels provided in the downlink time slots. That is, the first terminal apparatus 26 is assigned one downlink time slot for each frame. The same applies to the second terminal apparatus 26. As a result, similarly to FIG. 5 the communication speed of downlink can be set higher than that of uplink. This meets the request because the higher transmission rate is required by the downlink than by the uplink in consideration of the usage where mails are loaded and the Internet is accessed.

Further, a description of FIG. 5D is given, as follows, based on values in a personal handyphone system. In the uplink, the first terminal apparatus 26 and the second terminal apparatus 26 correspond to a half-rate mode, so that communication with the first terminal apparatus 26 and the second terminal apparatus 26 is executed at 16 kbps. And in the downlink the communication with the first terminal apparatus 26 and the second terminal apparatus 26 is executed at 32 kbps. Note that the uplink may be in a quarter-rate mode instead of the half-rate mode.

FIG. 5E shows a structure of channels allocated by the base station apparatus 10 according to the present embodiment. FIG. 5E corresponds to a form in which FIG. 5C is combined with FIG. 5D. That is, in the uplink, the first terminal apparatus 26 to the fourth terminal apparatus 26 are assigned to four uplink time slots in one frame, and the fifth terminal apparatus 26 to the eighth terminal apparatus 26 are assigned to four uplink time slots in another frame. In the downlink, eight channels are provided for each downlink time slot, and the first terminal apparatus 26 to the eighth terminal apparatus 26 are assigned to the respective channels. Accordingly, the first terminal apparatus 26 is assigned one uplink time slot for every two frames. The same applies to the second terminal apparatus 26 to the eighth terminal apparatus 26. On the other hand, the first terminal apparatus 26 is assigned four downlink channels for each frame. The same applies to the second terminal apparatus 26 to the eighth terminal apparatus 26.

Figure 6:
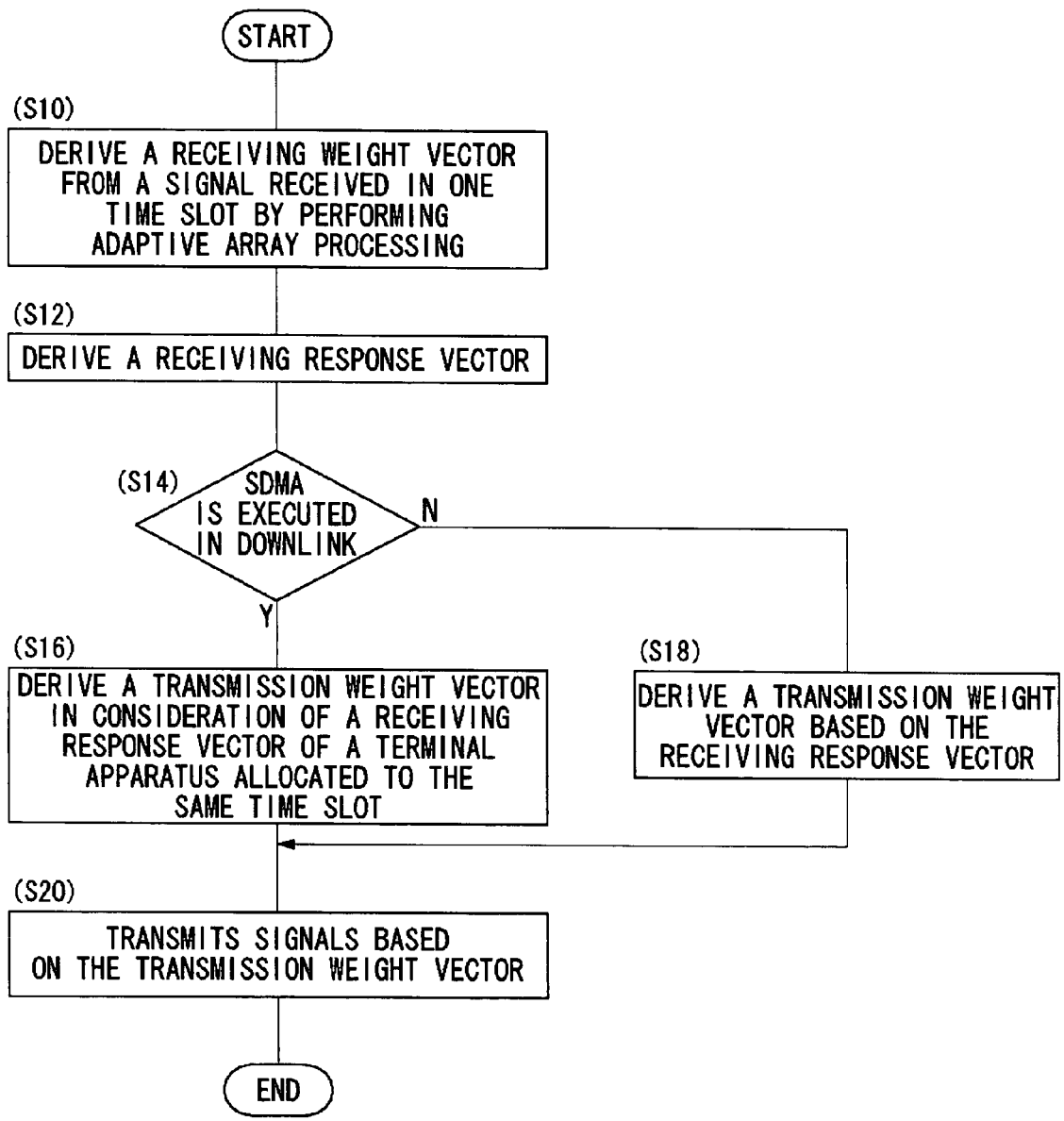
FIG. 6 is a flowchart showing a procedure for receiving processing and transmission processing by a base station apparatus of FIG. 1.

FIG. 6 is a flowchart showing a procedure for receiving processing and transmission processing by the base station apparatus 10. In the receiving processing, the first signal processing unit 14a derives receiving weight vectors 308 from digital received signals in each time slot, by performing adaptive array processing thereon (S10). Further, the first signal processing unit 14a derives receiving response vectors 402 (S12). If the control unit 20 is executing SDMA in the downlink (Y of S14), namely a plurality of channels are assigned to any of downlink time slots, the signal processing unit 14 will derive a transmission weight vector 310 for a predetermined terminal apparatus 26 while the receiving response vectors 402 of the other terminal apparatuses 26 assigned to the same time slot are taken into consideration (S16). If, on the other hand, SDMA is not being executed in the downlink by the control unit 20 (S14), the signal processing unit 14 derives the transmission weight vector 310 for said terminal apparatus 26 from the transmission weight vector 310 for the predetermined terminal apparatus 26 (S18). Based on the derived transmission weight vector 310, the base station apparatus 10 transmits signals for the predetermined terminal apparatus 26 (S20).

An operation of the communication system 100 structured as above will be described based on FIG. 7. FIG. 7 is a sequence diagram showing a procedure for communication processing by the communication system 100. Here a description will be given of a procedure in which the two terminal apparatuses 26 not shown in FIG. 1 request channel allocation from the base station apparatus 10 and communication is performed between the base station apparatus 10 and the two terminal apparatuses 26. The two terminal apparatuses 26 are indicated here as the first terminal apparatus 26a and the second terminal apparatus 26b. The first terminal apparatus 26a sends a connection request to the base station apparatus 10 (S50). The base station apparatus 10 allocates a channel to the first terminal apparatus 26a and transmits channel allocation information containing information on the allocated channel (S52). Note that although a plurality of signals may be communicated between the base station apparatus 10 and the first terminal apparatus 26a during a period from the connection request till the channel allocation, the description thereof is omitted here for the sake of simplicity. The second terminal apparatus 26b sends a connection request to the base station apparatus 10 (S54). The base station apparatus 10 allocates a channel to the second terminal apparatus 26b and transmits channel allocation information containing information on the allocated channel (S56). It is assumed here that in the downlink the base station apparatus 10 has determined that the first terminal apparatus 26a and the second terminal apparatus 26b are connected with the base station apparatus 10 through SDMA.

The first terminal apparatus 26a transmits data to the base station apparatus 10 in the allocated time slots (S58). The base station apparatus 10 derives receiving weight vector 308, processes the received signals and derives receiving response vectors 402 (S60). The second terminal apparatus 26b transmits data to the base station apparatus 10 in the allocated time slots (S62). The base station apparatus 10 derives receiving weight vector 308, processes the received signals and derives receiving response vectors 402 (S64). Further, the base station apparatus 10 derives transmission weight vectors 310 from the receiving weight vectors 402 for the first terminal apparatus 26a and those 402 for the second terminal apparatus 26b (S66). Based on the transmission weight vectors 310, the base station apparatus 10 transmits data to the first terminal apparatus 26a (S70) and, at the same time, transmits data to the second terminal apparatus 26b (S70). For convenience, Step 68 and Step 70 are shown here as separate steps from each other. However, since SDMA is performed on the first terminal apparatus 26a and the second terminal apparatus 26b, these steps are processed as a single step under normal circumstance.

According to the present embodiments, SDMA is not executed in the uplink and SDMA is executed in the downlink, so that the transmission quality in the uplink can be raised and at the same time the transmission capacity of the downlink can be improved. Since SDMA is not executed in the uplink and SDMA is executed in the downlink, there is no effect of other terminal apparatuses. And since the correspondence between the estimated result and the terminal apparatuses are done reliably, the estimation accuracy is enhanced. Since the accuracy in estimating the receiving channel characteristics is enhanced, the accuracy in estimating the transmitting channel characteristics is also enhanced. Since the accuracy in estimating the transmitting channel characteristics is enhanced, the degradation of characteristics due to SDMA can be prevented.

In the uplink, one channel is provided for one time slot, so that the accuracy in estimating the receiving channel characteristics for a terminal apparatus assigned to the channel is improved. In the uplink, one channel is provided for one time slot, so that the separation of the receiving channel characteristics for each of a plurality of terminal apparatuses can be eliminated. For each terminal apparatus, a greater number of channels are assigned in the downlink than in the uplink. This is suitable for the usage of application that requires a larger transmission capacity in the down link than in the uplink. Since the communication quality in the downlink improves, the communication stability is improved. Since the communication quality in the downlink improves, the throughput improves. Since the communication quality in the downlink improves, the communication area is enlarged. Also, the absorbing ability of capacity in the downlink-improves.

The present invention has been described based on the embodiments. These embodiments are merely exemplary, and it is understood by those skilled in the art that various modifications to the combination of each component and process thereof are possible and that such modifications are also within the scope of the present invention.

In the present embodiments, the communication system 100 is a personal handyphone system. However, it is not limited thereto and, for example, it may be a celler phone system, a third-generation celler phone system, a radio LAN system and an FWA (Fixed Wireless Access) system. According to this modification, the present invention can be applied to various communication systems 100. That is, it suffices if the base station apparatus 10 is capable of executing SDMA and it executes TDD.

In the present embodiments, it is assumed that the base station apparatus 10 multiplexes a plurality of terminal apparatuses 26 in the uplink though TDMA. However, it is not limited thereto and, for example, a plurality of terminal apparatuses 26 may be multiplexed by the combination of FDMA and TDMA. According to this modification, a plurality of terminal apparatuses 26 in the uplink can be multiplexed using various methods. That is, it suffices if access other than SDMA is used and TDD is executed in at least one frequency band.

INDUSTRIAL APPLICABILITY

According to the present invention, the incompleteness of spatial separation of a plurality of terminal apparatuses in SDMA can be improved.

What is claimed is:

1. A base station apparatus, comprising:
a communication unit which communicates with a plurality of terminal apparatuses, respectively; and
a control unit which allocates, in an uplink, the plurality of terminal apparatuses to a plurality of time slots in a manner that the plurality of terminal apparatuses are multiple-accessed by division of time and which allocates, in a downlink, the plurality of terminal apparatuses respectively allocated to the plurality of time slots in the uplink to a single time slot in a manner that the plurality of terminal apparatuses are multiple-accessed by division of space, wherein the communication unit comprises a receiving processing unit which receives respectively signals from the plurality of terminal apparatuses which have been multiple-accessed by the division of time and which derives respectively, for each time slot, receiving channel characteristics corresponding to the plurality of terminal apparatuses at mutually different timings; and a transmission processing unit which derives transmitting channel characteristics for the plurality of terminal apparatuses that are used at the same timing from the receiving channel characteristics for the plurality of terminal apparatuses derived by the receiving processing unit at mutually different timings and which transmits signals respectively to the plurality of terminal apparatuses which have been multiple-accessed by the division of space, based on the derived transmitting channel characteristics, wherein the control unit configures a frame to include a plurality of time slots for the uplink and a plurality of time slots for the downlink and allocates, in the uplink, different time slots within a single frame to the plurality of terminal apparatuses to be allocated to a single time slot in the downlink.

2. A base station apparatus according to claim 1, wherein time slots to which a plurality of terminal apparatuses are to be allocated by said control unit are such that a plurality of time slots constitutes one frame, and frames are arranged contiguously, and the plurality of terminal apparatuses allocated respectively to time slots contained in different frames in the uplink are allocated to one time slot in the downlink.

3. A channel allocation method comprising:

communicating with a plurality of terminal apparatuses, respectively; allocating, in an uplink, the plurality of terminal apparatuses to a plurality of time slots in a manner that the plurality of terminal apparatuses are multiple-accessed by division of time and allocating, in a downlink, the plurality of terminal apparatuses respectively allocated to the plurality of time slots in the uplink to a single time slot in a manner that the plurality of terminal apparatuses are multiple-accessed by division of space, wherein the communicating comprises receiving respectively signals from the plurality of terminal apparatuses which have been multiple-accessed by the division of time and deriving respectively, for each time slot, receiving channel characteristics corresponding to the plurality of terminal apparatuses at mutually different timings; and deriving transmitting channel characteristics for the plurality of terminal apparatuses that are used at the same timing from the derived receiving channel characteristics for the plurality of terminal apparatuses derived at mutually different timings and transmitting signals respectively to the plurality of terminal apparatuses which have been multiple-accessed by the division of space, based on the derived transmitting channel characteristics, wherein the allocating configures a frame to include a plurality of time slots for the uplink and a plurality of time slots for the downlink and allocates, in the uplink, different time slots within a single frame to the plurality of terminal apparatuses to be allocated to a single time slot in the downlink.

* * * * *